United States Patent [19]

Iwasaki

[11] Patent Number: 5,012,491
[45] Date of Patent: Apr. 30, 1991

[54] PREAMBLE DETECTION CIRCUIT FOR DIGITAL COMMUNICATIONS SYSTEM

[75] Inventor: Motoya Iwasaki, Tokyo, Japan
[73] Assignee: NEC Corporation, Tokyo, Japan
[21] Appl. No.: 390,040
[22] Filed: Aug. 7, 1989

[30] Foreign Application Priority Data

Aug. 5, 1988 [JP] Japan .................................. 63-195911

[51] Int. Cl.⁵ ............................................. H04B 1/26
[52] U.S. Cl. ........................................ 375/96; 375/97; 375/98; 375/114
[58] Field of Search ........................ 375/15, 77, 94, 96, 375/97, 98, 106, 119, 120, 84, 85, 86, 114, 116; 329/304, 307, 358, 360, 361, 363; 455/257, 258, 260, 265

[56] References Cited

U.S. PATENT DOCUMENTS

| | | | |
|---|---|---|---|
| 3,993,956 | 11/1976 | Gilmore et al. | 375/96 |
| 4,146,841 | 3/1979 | McRae | 375/119 |
| 4,149,121 | 4/1979 | Gordy et al. | 375/96 |
| 4,164,036 | 8/1979 | Wax | 375/96 |
| 4,397,039 | 8/1983 | McAuliffe | 455/265 |

*Primary Examiner*—Benedict V. Safourek
*Attorney, Agent, or Firm*—Sughrue, Mion, Zinn, Macpeak & Seas

[57] ABSTRACT

In a burst mode digital communication system, a preamble containing a predetermined bit pattern and a digital signal are modulated upon orthogonal carriers and transmitted in a series of burst signals. At a distant end of the system, the preamble and the digital signal are noncoherently detected with locally generated orthogonal carriers having the same frequency as the transmitted orthogonal carries to produce in-phase and quadrature signals. First and second correlators are provided to perform a correlation calculation between a locally generated bit pattern and the in-phase signal and to perform a correlation calculation between the local bit pattern and the quadrature signal. A phase error of the local carriers with respect to the transmitted carriers is detected from the outputs of the first and second correlators. A clock phase error of a locally generated clock pulse with respect to symbols contained in the transmitted burst signals is detected from one of the outputs of the correlators. Power level detector is connected to the outputs of the correlators for detecting a power level of the received burst signals. The carrier and clock phase error detection as well as the power level detection are performed in a parallel fashion, allowing a reduction of the amount of information contained in the preamble.

10 Claims, 4 Drawing Sheets

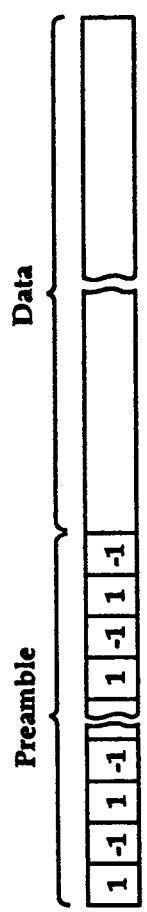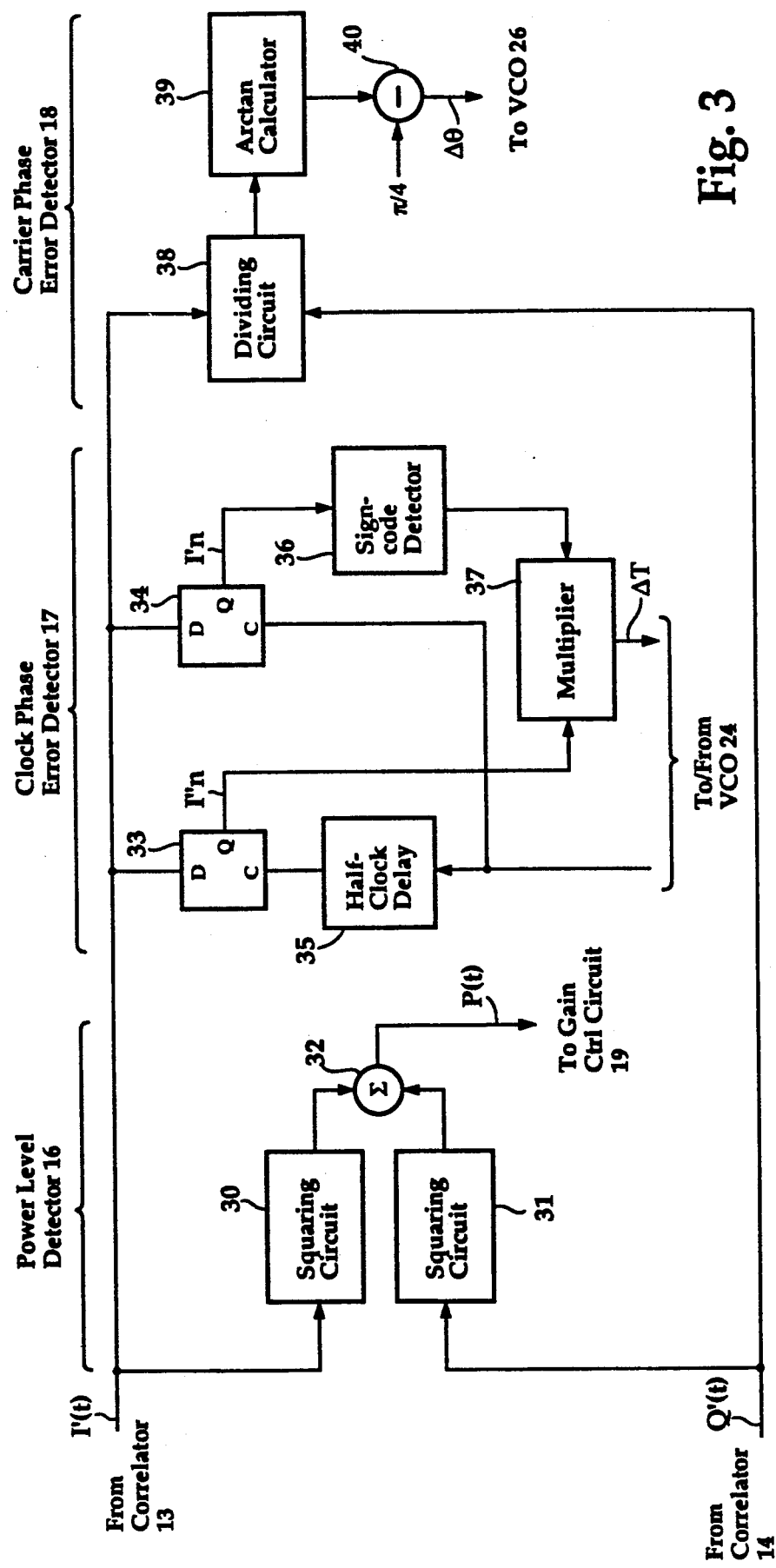

○ : Sample value I'n
● : Sample value I"n

PREAMABLE DETECTION CIRCUIT FOR DIGITAL COMMUNICATIONS SYSTEM

BACKGROUND OF THE INVENTION

The present invention relates generally to burst mode digital communications systems, and more specifically it relates to a technique for reducing the amount of information contained in the preamble of each burst transmission that is necessary for recovering carrier and clock timing at a receiving end of the system.

In a burst mode of digital transmission, a preamble is transmitted at the beginning of each burst transmission to convey information as to the carrier and symbol clock timing of a modulator to allow receiving stations to establish correct timing relationships with the carrier and symbol clock of the modulator. The preamble is made up of a carrier recovery field and a clock recovery field that follows. On receiving a preamble, the receiver's function is to first analyze the carrier recovery field to establish correct timing with the carrier of the modulator and then proceed to the clock recovery field to establish proper symbol clock timing. In addition, an automatic gain control signal is derived from the received signal after the clock recovery procedure is complete.

Because of the sequential operations, the time taken to process the preamble is substantial and hence the transmission efficiency of the current burst mode of digital communications system is low.

SUMMARY OF THE INVENTION

It is therefore an object of the present invention to provide a preamble detection circuit that requires a small amount of preamble information for establishing carrier and clock timing and controlling preamplifier gain by deriving error control signals simultaneously during the reception of a preamble.

According to one aspect of the present invention, a preamble detection circuit is provided. At a transmitter, a preamble containing a predetermined bit pattern and a digital signal are modulated upon orthogonal carriers and transmitted in a series of burst signals. The preamble detection circuit noncoherently ("pseudo-synchronously") detects the preamble and digital signal with locally generated orthogonal carriers having the same frequency as the transmitted orthogonal carriers to produce in-phase and quadrature signals. The locally generated carriers tend to deviate in phase from the transmitted orthogonal carriers over a predetermined range. First and second correlators are provided to perform a correlation calculation between a locally generated bit pattern which corresponds to the bit pattern of the preamble and the in-phase signal and to perform a correlation calculation between the locally generated bit pattern and the quadrature signal. A phase error of the locally generated orthogonal carriers with respect to the transmitted carriers is detected from the outputs of the first and second correlators. A clock phase error of a locally generated clock pulse with respect to transmitted symbols is detected from one of the outputs of the correlators. Power level detector is preferably connected to the outputs of the correlators for detecting a power level of the received burst signals.

Since the carrier and clock phase error detection and the power level detection can be performed in a parallel fashion, the amount of information contained in the preamble can be reduced.

According to a second aspect, a digital communication system incorporating the preamble detection circuit is provided. The system includes a gain-controlled amplifier for amplifying burst signals received from a transmitter station with a gain controlled with the power level detected by the power level detector. A symbol clock generator generates a local clock pulse at a symbol rate of the transmitted burst signals. First and second decision circuits, or A/D converters, are responsive to the local clock pulse for sampling the in-phase and quadrature output signals from the correlators. A clock phase error detector is connected to one of the outputs of the correlators and to the output of the symbol clock generator for detecting a phase error of the local clock pulse with respect to symbols of the transmitted burst signals and controlling the symbol clock generator with the detected phase error. A carrier generator generates second local orthogonal carriers. Using the second local carriers, a synchronous detector provides synchronous detection on output signals from the first and second decision circuits. A carrier phase error detector is connected to the outputs of the first and second correlators for detecting a phase error of the local orthogonal carriers with respect to the transmitted carriers and controlling the carrier generator with the detected phase error.

BRIEF DESCRIPTION OF THE DRAWINGS

The present invention will be described in further detail with reference to the accompanying drawings, in which:

FIG. 2 shows a data structure of a burst transmission employed in the present invention;

FIG. 3 shows details of the error detection circuit of FIG. 1, including the power level detector, clock phase error detector and carrier phase error detector;

DETAILED DESCRIPTION

Figure 1:
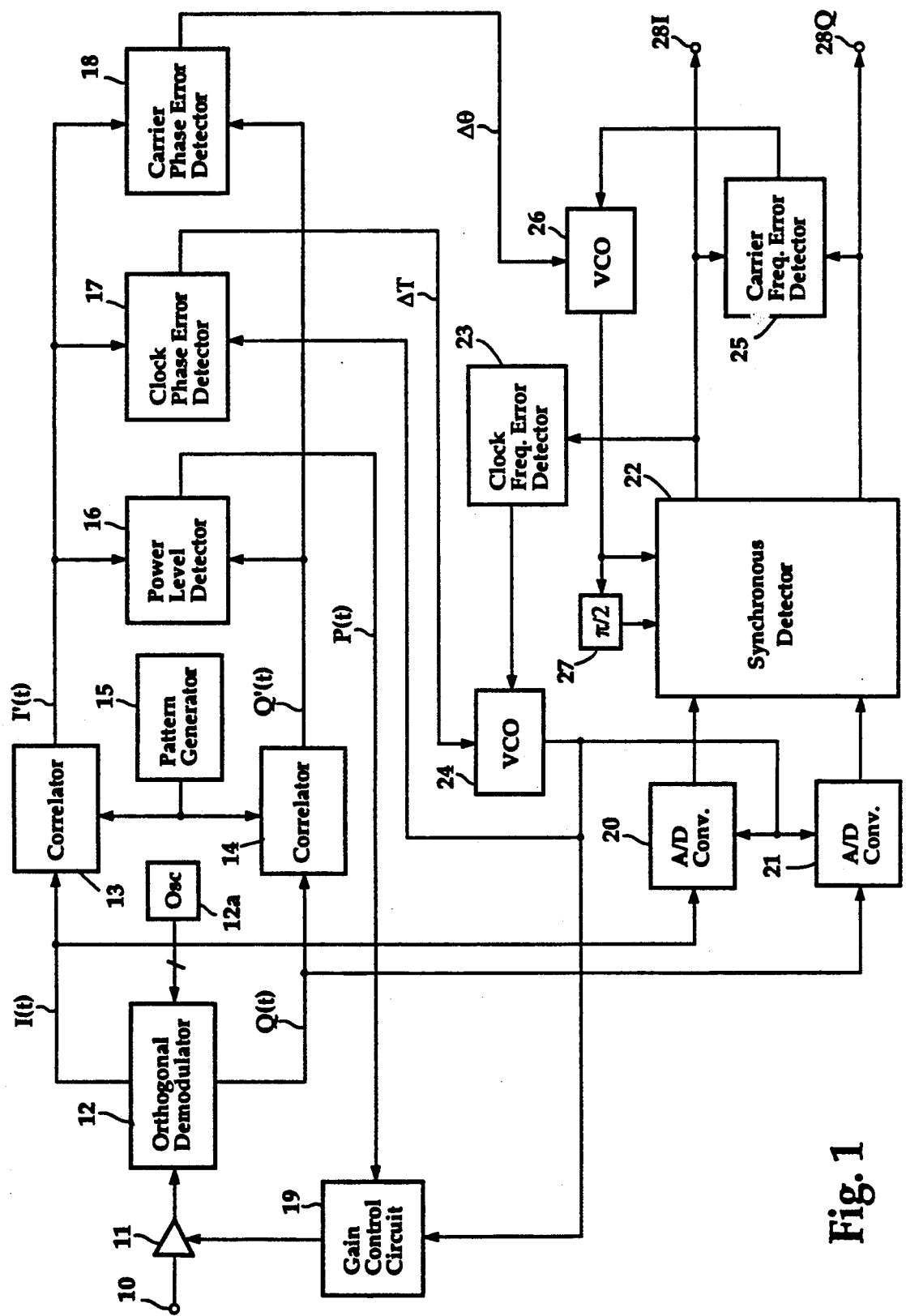
FIG. 1 is a block diagram of a receiving station of a digital communication system according to an embodiment of the present invention.

Referring now to FIG. 1, there is shown a receiving station of a burst mode digital radio communication system according to an embodiment of the present invention. Through an input terminal 10 the station receives a transmitted burst of a QPSK (quadriphase shift keyed) signal which comprises a preamble and a data field as shown in FIG. 2. The preamble contains a sequence of +1 and −1 binary logic values of a predetermined number which alternate at symbol clock intervals T. No discrimination is made between a carrier recovery field and a clock recovery field as in the format of the prior art preamble.

Figure 4:
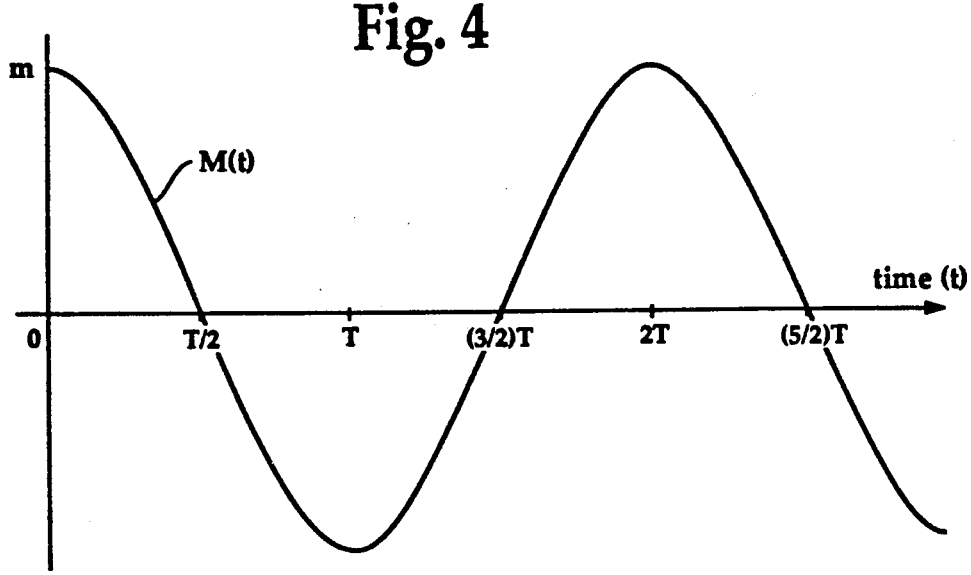
FIG. 4 shows a waveform of a portion of the preamble of a modulated QPSK incoming signal.

The preamble of each burst transmission at terminal 10 has a waveform M(t) which is represented by $m(t)(\cos \omega_c t + \sin \omega_c t)$ as illustrated in FIG. 4, where m(t) is +1 for t=2nT, −1 for t=(2n+1)T and 0 for t=(n+½)T, and $\omega_c$ is the angle frequency of the carrier of the burst signal and n is an integer including zero. The signal contained in the preamble is passed through a gain-controlled preamplifier stage 11 to a QPSK (quadriphase shift keying) orthogonal demodulator 12. A local oscillator 12a is provided to supply demodulator 12 with local orthogonal carriers having the same frequency as the transmitted carriers. The local carriers may deviate in phase from the transmitted carriers in a range between $-\pi$ and $+\pi$. Therefore, the incoming signal is demodulated in a "pseudo-synchronous mode", or noncoherent detection mode to recover the following in-phase and quadrature components I(t) and Q(t):

$$I(t) = \tfrac{1}{2} m(t)(\cos \Delta\theta - \sin \Delta\theta) \quad (1)$$

$$Q(t) = \tfrac{1}{2} m(t)(\cos \Delta\theta + \sin \Delta\theta) \quad (2)$$

These components appear at the inputs of correlators 13 and 14, respectively.

Figure 5:
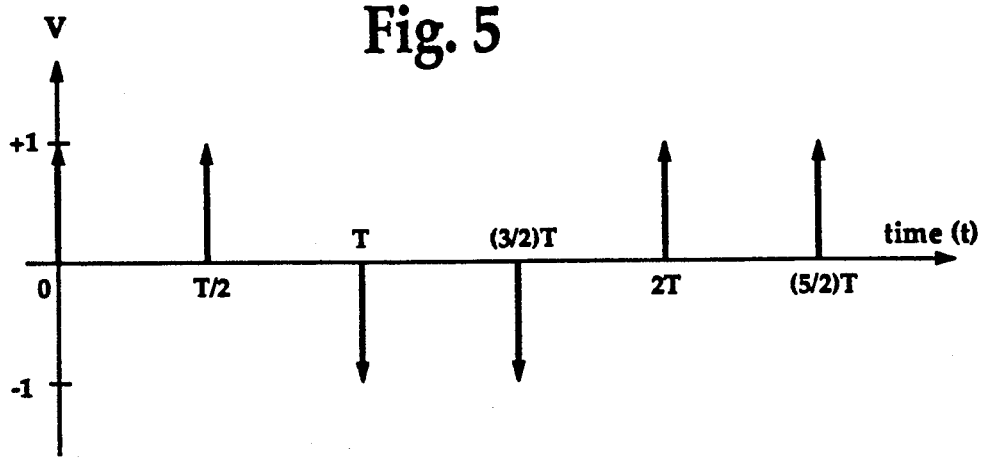
FIG. 5 shows a portion of the locally generated predetermined bit pattern supplied to the correlators of FIG. 1.

A pattern generator 15 is provided to supply to the correlators 13 and 14 a sequence V(T) of symbol bits which is given by the following relation:

$$V(t) = \sum_{n=0}^{2N-1} V_n \delta\left(t - \frac{T}{2}\right)n \quad (3)$$

where N is the number of symbol bits contained in the preamble, $\delta(t)$ is the delta function, and $V_n$ assumes +1 for n=4k or 4k+1 or −1 for n=4k+2 or 4k+3 (where k is an integer including zero). Therefore, $V_n$ is a series of 2N symbols of +1, +1, −1, −1, +1, +1, ... −1, −1 as shown FIG. 5.

Each of the correlators 13 and 14 performs correlation calculation to produce output signals I'(t) and Q'(t), respectively, which are given by:

$$I'(t) = \int V(\tau) I(T-\tau) d\tau \quad (4)$$

$$= \sum_{n=0}^{2N-1} V_n I\left(t - \frac{T}{2} n\right)$$

$$= \sum_{k=0}^{(N/2)-1} \left[ m\left(t - \frac{T}{2} \cdot 4k\right) + m\left(t - \frac{T}{2}(4k+1)\right) - m\left(t - \frac{T}{2}(4k+2)\right) - m\left(t - \frac{T}{2}(4k+3)\right) \right](\cos\Delta\theta - \sin\Delta\theta)$$

$$Q'(t) = \int V(\tau) Q(T-\tau) d\tau \quad (5)$$

$$= \sum_{n=0}^{2N-1} V_n Q\left(t - \frac{T}{2} n\right)$$

$$= \sum_{k=0}^{(N/2)-1} \left[ m\left(t - \frac{T}{2} \cdot 4k\right) + m\left(t - \frac{T}{2}(4k+1)\right) - m\left(t - \frac{T}{2}(4k+2)\right) - m\left(t - \frac{T}{2}(4k+3)\right) \right](\cos\Delta\theta + \sin\Delta\theta)$$

Since m(t) is given by the following equations:

$$m(t-2kT) = m(t) \quad (6)$$

$$m\{t-(2k+1)T\} = -m(t) \quad (7)$$

$$m(t-T/2-2kT) = m(t-T/2) \quad (8)$$

$$m\{t-T/2-(2k+1)T\} = -m(t-T/2) \quad (9)$$

the in-phase and quadrature signals I'(t) and Q'(t) during the reception of a preamble can be represented by:

$$I'(t) = N[m(t) + m(t-T/2)](\cos \Delta\theta - \sin \Delta\theta) \quad (10)$$

$$Q'(t) = N[m(t) + m(t-T/2)](\cos \Delta\theta + \sin \Delta\theta) \quad (11)$$

Figure 6:
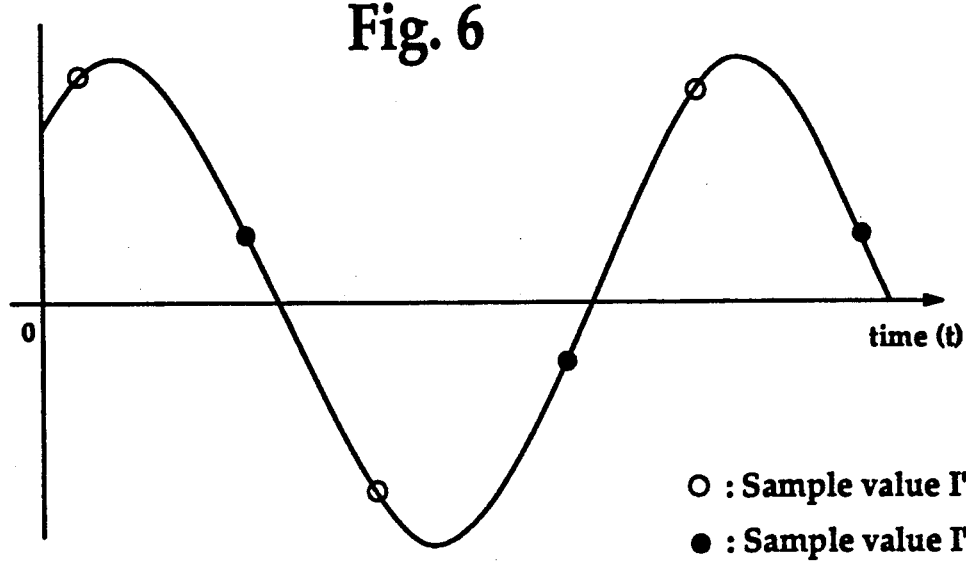
FIG. 6 shows a portion of the waveform of the output signal of one of correlators of FIG. 1.

FIG. 6 depicts the waveform of the in-phase signal I'(t) as a result of the correlation calculation between the symbols from the pattern generator 15 and those of the preamble contained in the in-phase signal I(t). A similar waveform is derived from the correlation calculation between the symbols from the pattern generator 15 and those of the preamble contained in the quadrature signal Q(t). The outputs of the correlators 13 and 14 are coupled to an error detection circuit including a power level detector 16, a clock phase error detector 17 and a carrier phase error detector 18. Details of the detector circuits 16, 17 and 18 will be described with reference to FIG. 3.

On the other hand, the outputs of demodulator 12 are further coupled to analog-to-digital converters 20 and 21, respectively, to produce digital versions of the in-phase and quadrature signals I(t) and Q(t) for coupling to a synchronous detector 22. Sampling pulses are supplied to the A/D converters 20 and 21 at symbol clock timing from a closed loop including a clock frequency error detector 23 coupled to one output terminal of the synchronous detector 22 and a voltage-controlled oscillator 24 which is responsive to a frequency error from the detector 23 as well as to a phase error supplied from the clock phase error detector 17. Clock frequency error detector 23 includes a zero-crossing detector and a loop filter to generate a signal representative of a frequency deviation of the VCO 24 from the transmitted symbol clock frequency.

Orthogonal reference carriers for the synchronous detector 22 are obtained by a closed loop formed by a carrier frequency error detector 25 coupled to the outputs of synchronous detector 22 which respectively lead to output terminals 28I and 28Q, a voltage-controlled oscillator 26 responsive to the outputs of the frequency error detector 25 as well as to a carrier phase error supplied from the phase error detector 18, and a $\pi/2$ phase shifter 27 coupled to the VCO 23. Carrier frequency error detector 25 includes a phase discriminator coupled to the outputs of synchronous detector 22 and a loop filter to generate a signal representative of a frequency deviation of the VCO 23 from an intended value.

A gain control circuit 19 is provided to respond to the outputs of power level detector 16 and VCO 24 by maintaining the output power level of preamplifier stage 11 at a constant level.

As shown in FIG. 3, clock phase error detector 17 comprises D flip-flops 33 and 34 whose data inputs are coupled to one of the outputs of correlators 13 and 14. The output of VCO 24 is supplied to the clock input of flip-flop 33 through a delay circuit 35 that introduces a half-symbol interval (=T/2) on the one hand, and directly to the clock input of flip-flop 34 on the other. The output of flip-flop 33 is coupled to one input of a multiplier 37 and the output of flip-flop 34 is coupled to a sign-code detector 36 whose output is connected to the other input of multiplier 37. The output of multiplier 37 is representative of a phase error of the symbol clock timing and fed to the phase control input of the VCO 24. Assume that there is a phase delay of $\Delta T$ in the local symbol clock from VCO 24 with respect to that of the incoming signal, the sampling of the input signal $I'(t)$ by flip-flop 34 in response to the local symbol clock results in the generation of a sample value $I'_n$ which is given by:

$$I'_n = I'(nT + \Delta T) \qquad (12)$$

where, $0 \leq \Delta T < T$. On the other hand, the sampling of the signal $I'(t)$ by flip-flop 33 in response to the output of delay 35 results in the generation of a sample value $I''_n$ which is given by:

$$I''_n = I'(nT + T/2 + \Delta T) \qquad (13)$$

Figure 7:
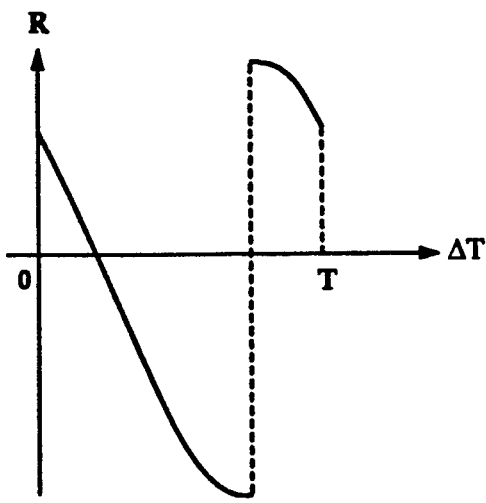
FIGS. 7–9 are illustrations of the outputs of the clock phase error detector, carrier phase error detector and power level detector of FIG. 3, respectively.

Typical examples of the sample values $I'_n$ and $I''_n$ are respectively indicated by blank and solid dots in FIG. 6. Sign-code detector 36 produces a signal SGN $(I'_n)$ which is multiplied by $I''_n$ by multiplier 37 to produce a clock phase error signal which is given by:

$$R = \text{SGN}(I'_n)I''_n \qquad (14)$$

where SGN (.) denotes the signum function. This signal varies exclusively as a function of symbol clock phase error $\Delta T$ as shown in FIG. 7.

Carrier phase error detector 18 is formed by a dividing circuit 38 that performs division calculation $Q'/I'$ on the signals from the correlators 13 and 14 and supplies the result of the calculation to an arctangent calculator 39, which calculates the following equation:

$$\begin{aligned}
S &= \tan^{-1}\left[\frac{Q'}{I'}\right] \\
&= \tan^{-1}\left[\frac{\cos\Delta\theta + \sin\Delta\theta}{\cos\Delta\theta - \sin\Delta\theta}\right] \\
&= \tan^{-1}\left[\frac{\sin(\Delta\theta + \pi/4)}{\cos(\Delta\theta + \pi/4)}\right] \\
&= \Delta\theta + \pi/4
\end{aligned} \qquad (15)$$

Figure 8:
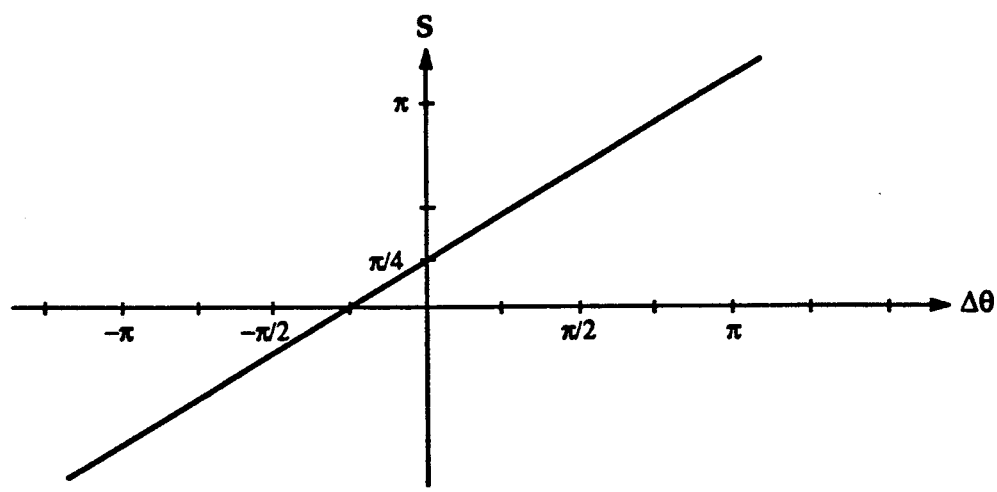

As illustrated in FIG. 8, the output of the arctangent calculator 39 is a signal that varies as a linear function of phase error $\Delta\theta$. The output of arctangent calculator 39 is fed to a subtractor 40 where $\pi/4$ is subtracted. The output of subtractor 40 is applied to VCO 26 as a carrier phase error.

Figure 9:
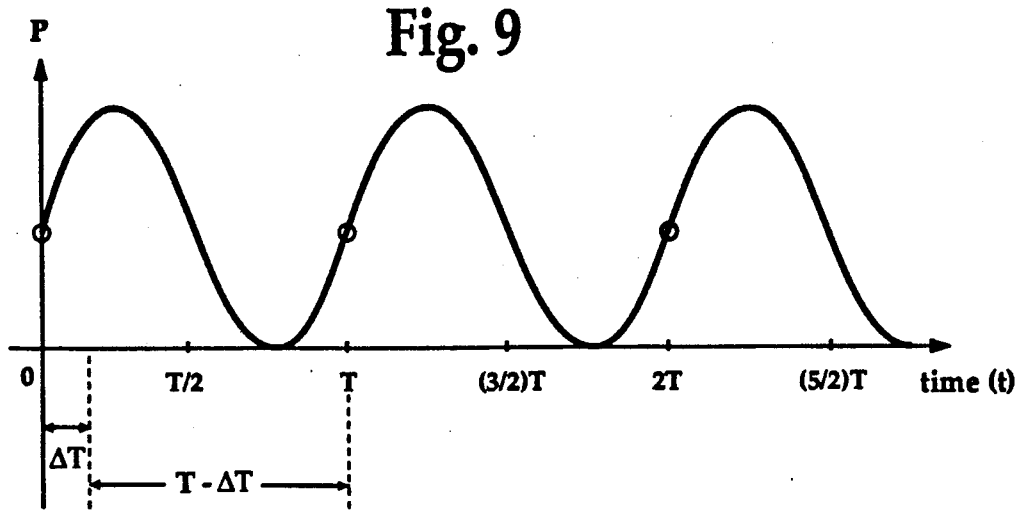

Power level detector 16 includes squaring circuits 30 and 31 respectively coupled to the outputs of correlators 13 and 14 to generate squared values $I'(t)$ and $Q'(t)$. An adder 32 adds up the squared signals $[I'(t)]^2$ and $[Q'(t)]^2$ to produce a signal $P(t)$ which is given by:

$$P(t) = [I'(t)]^2 + [Q'(t)]^2 = 2N^2[m(t) + m(t - T/2)]^2 \qquad (16)$$

and supplies the sum as a gain control signal to the gain control circuit 19. As shown in FIG. 9, the gain control signal varies exclusively with the amplitude $m(t)$ of the incoming signal and represents its signal power.

The operation of gain control circuit 19 is based on the sampling of the output of power level detector 16 in response to the output of VCO 24 so that the sampled value is a faithful representation of power level at the time the phase error control signal $\Delta T$ is generated. The gain and phase error control signals can therefore be derived in a short period of time and hence the amount of information contained in the preamble of each burst transmission can be reduced to achieve high transmission efficiency.

The system operates satisfactorily with the local oscillator included in the orthogonal demodulator 12 of the type mentioned above if the amount of time necessary for error detection is much less than a period $1/\Delta f$, (where $\Delta f$ represents the frequency deviation of the local oscillator of demodulator 12 from the carrier frequency of the incoming signal).

According to another feature of the invention, the use of correlators 13 and 14 ensures high signal-to-noise ratio at their outputs by as much as $\{(10/2)\log_{10}N\}$ dB. This is advantageous for the error detection circuit to derive control signals.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A preamble detection circuit for a receive end of a transmission system in which a preamble containing a predetermined bit pattern and a digital signal are modulated upon orthogonal carriers and transmitted in a series of burst signals from a transmit end of the system, said receive end comprising symbol clock generator means for generating a local clock pulse, sampler means for sampling orthogonal signals in response to said local clock pulse, variable-frequency carrier generator means for generating first local orthogonal carriers having variable frequency and phase, and synchronous detector means for synchronously detecting the transmitted symbols from outputs of said sampler means with said first local orthogonal carriers, said circuit comprising:

orthogonal demodulator means for noncoherently detecting the transmitted burst signals with second local orthogonal carriers of constant frequency equal to the frequency of the transmitted orthogonal carriers, said second local orthogonal carriers tending to deviate in phase over a predetermined range from the transmitted orthogonal carriers, said orthogonal demodulator means generating in-phase and quadrature output signals as said orthogonal signals:

means for generating a local bit pattern corresponding to the bit pattern contained in said preamble;

first and second correlators, the first correlator providing a correlation calculation between the local bit pattern and the in-phase output signal and the second correlator providing a correlation calculation between the local bit pattern and the quadrature output signal;

carrier phase error detector means connected to the outputs of the first and second correlators for detecting a carrier phase error of the second local orthogonal carriers with respect to the transmitted carriers and controlling said variable-frequency carrier generator means with the detected carrier phase error; and clock phase error detector means connected to be responsive to one of the outputs of the first and second correlators and to the output of the symbol clock generator means for detecting a clock phase error of the local clock pulse with respect to symbols contained in the transmitted burst signals and controlling the symbol clock generator means with the detected clock phase error.

2. A preamble detection circuit as claimed in claim 1, further comprising power level detector means connected to the outputs of the first and second correlators for detecting a power level of the received burst signals.

3. A preamble detection circuit as claimed in claim 1, wherein the bit pattern contained in the preamble is a series of alternating binary logic values.

4. A preamble detection circuit as claimed in claim 1, wherein the carrier phase error detector means comprises:
a division circuit for providing a division calculation between the in-phase and quadrature output signals to produce a quotient; and
arctangent calculator means for determining the arctangent of the quotient.

5. A preamble detection circuit as claimed in claim 1, wherein the clock phase error detector means comprises:
delay means for delaying the local clock pulse by an amount corresponding to one-half the interval between successive symbols contained in the transmitted burst signals;
first sampling means for sampling one of the in-phase and quadrature output signals in response to the delayed local clock pulse;
second sampling means for sampling the one of said in-phase and quadrature output signals in response to the local clock pulse;
symbol detector means for detecting a predetermined symbol from the output of the second sampling means; and
multiplier means for generating a signal representative of a product of the output of the first sampling means and the predetermined symbol.

6. A digital communication system in which a preamble and a digital signal are modulated upon orthogonal carriers and transmitted to a distant end of the system in a series of burst signals, the preamble containing a predetermined bit pattern for carrier and clock recovery at the distant end of the system, comprising at the distant end:
gain-controlled amplifier means for receiving the transmitted burst signals and amplifying the received signals;
orthogonal demodulator means connected to the amplifier means for noncoherently detecting the preamble and the digital signal with local orthogonal carriers having the same frequency as the frequency of the transmitted orthogonal carriers, said local orthogonal carriers tending to deviate in phase over a predetermined range from the transmitted orthogonal carriers, said orthogonal demodulator means generating in-phase and quadrature output signals;
means for generating a local bit pattern corresponding to the bit pattern contained in said preamble;
first and second correlators, the first correlator providing a correlation calculation between the local bit pattern and the in-phase output signal and the second correlator providing a correlation calculation between the local bit pattern and the quadrature output signal;
symbol clock generator means for generating a local clock pulse at a symbol rate of the transmitted burst signals;
first and second decision circuits responsive to the local clock pulse for respectively sampling the in-phase and quadrature output signals;
clock phase error detector means connected to one of the outputs of the first and second correlators and to the output of the symbol clock generator means for detecting a phase error of the local clock pulse with respect to symbols contained in the transmitted burst signals and controlling the symbol clock generator means with the detected phase error;
carrier generator means for generating second local orthogonal carriers;
synchronous detector means for providing synchronous detection on output signals from the first and second decision circuits with the second local orthogonal carriers;
carrier phase error detector means connected to the outputs of the first and second correlators for detecting a phase error of the local orthogonal carriers with respect to the transmitted carriers and controlling the carrier generator means with the detected phase error; and
power level detector means connected to the outputs of the first and second correlators for detecting a power level of the received burst signals and controlling the gain-controlled amplifier means with the detected power level.

7. A digital communication system as claimed in claim 6, wherein the bit pattern contained in the preamble is a series of alternating binary logic values.

8. A digital communication system as claimed in claim 6, wherein the carrier phase error detector means comprises:
a division circuit for providing a division calculation between the in-phase and quadrature output signals to produce a quotient; and
arctangent calculator means for determining the arctangent of the quotient.

9. A digital communication system as claimed in claim 6, wherein the clock phase error detector means comprises:
delay means for delaying the local clock pulse by an amount corresponding to one-half the interval between successive symbols contained in the transmitted burst signals;
first sampling means for sampling one of the in-phase and quadrature output signals in response to the delayed local clock pulse;
second sampling means for sampling the one of said in-phase and quadrature output signals in response to the local clock pulse;
symbol detector means for detecting a predetermined symbol from the output of the second sampling means; and
multiplier means for generating a signal representative of a product of the output of the first sampling means and the predetermined symbol.

10. A digital communication system as claimed in claim 6, further comprising means for sampling the detected power level in response to the local clock pulse and supplying the sampled power level to the gain-controlled amplifier means as said detected power level.

* * * * *

UNITED STATES PATENT AND TRADEMARK OFFICE
CERTIFICATE OF CORRECTION

PATENT NO. : 5,012,491
DATED : April 30, 1991
INVENTOR(S) : Motoya IWASAKI

It is certified that error appears in the above-identified patent and that said Letters Patent is hereby corrected as shown below:

ON TITLE PAGE:

IN THE TITLE:

Delete "PREAMABLE" and insert --PREAMBLE--.

Signed and Sealed this

First Day of September, 1992

*Attest:*

DOUGLAS B. COMER

*Attesting Officer*　　　　Acting Commissioner of Patents and Trademarks